United States Patent
Shimizu

(10) Patent No.: US 8,445,586 B2
(45) Date of Patent: May 21, 2013

(54) PROCESS FOR PRODUCING N-VINYLAMIDE POLYMER

(75) Inventor: Koji Shimizu, Kanagawa-ken (JP)

(73) Assignee: Dia-Nitrix Co., Ltd., Tokyo (JP)

( * ) Notice: Subject to any disclaimer, the term of this patent is extended or adjusted under 35 U.S.C. 154(b) by 50 days.

(21) Appl. No.: 13/060,936

(22) PCT Filed: Jun. 29, 2009

(86) PCT No.: PCT/JP2009/002980
§ 371 (c)(1),
(2), (4) Date: May 2, 2011

(87) PCT Pub. No.: WO2010/023799
PCT Pub. Date: Mar. 4, 2010

(65) Prior Publication Data
US 2011/0230583 A1    Sep. 22, 2011

(30) Foreign Application Priority Data

Sep. 1, 2008 (JP) ................. 2008-222999

(51) Int. Cl.
C08F 2/46 (2006.01)
C08K 3/16 (2006.01)
C08K 3/10 (2006.01)
C08K 3/00 (2006.01)

(52) U.S. Cl.
USPC ........... 524/787; 524/779; 524/700; 524/800; 524/804; 524/807; 524/808; 524/812; 524/816; 524/849; 524/850; 524/916; 522/81; 522/84; 522/174; 522/176; 522/167

(58) Field of Classification Search
USPC .............. 522/81, 84, 174, 176, 167; 524/779, 524/187, 700, 800, 804, 808, 807, 812, 816, 524/849, 850, 916; 427/496, 487, 508
See application file for complete search history.

(56) References Cited

U.S. PATENT DOCUMENTS

| | | | | |
|---|---|---|---|---|
| 4,693,713 A | * | 9/1987 | Chmelir et al. | 604/368 |
| 4,718,899 A | * | 1/1988 | Itoh et al. | 604/368 |
| 5,290,880 A | * | 3/1994 | Moench et al. | 525/369 |
| 6,426,383 B1 | * | 7/2002 | Fong et al. | 524/827 |
| 6,894,110 B2 | * | 5/2005 | Fong et al. | 524/827 |
| 2002/0155090 A1 | | 10/2002 | Takahashi et al. | |
| 2002/0198317 A1 | * | 12/2002 | Fong et al. | 524/872 |
| 2010/0108944 A1 | * | 5/2010 | Stegmann et al. | 252/194 |

FOREIGN PATENT DOCUMENTS

| | | |
|---|---|---|
| JP | 8-269111 | 10/1996 |
| JP | 08-269111 | 10/1996 |
| JP | 2002-239380 | 8/2002 |
| JP | 2003-147007 | 5/2003 |
| JP | 2006-257287 | 9/2006 |

OTHER PUBLICATIONS

Extended European Search Report in EP 09 80 9457 dated Jul. 25, 2011.
International Search Report for PCT/JP2009/002980, mailed Jul. 21, 2009.
International Preliminary Report on Patentability (English version) in PCT/JP2009/002980 dated Apr. 21, 2011.

* cited by examiner

*Primary Examiner* — Sanza McClendon
(74) *Attorney, Agent, or Firm* — Nixon & Vanderhye P.C.

(57) ABSTRACT

The present invention provides a process for producing an N-vinylamide polymer in an efficient manner by an aqueous solution polymerization method in which a gel-like polymer having an excellent handling property can be produced, and a polymerization time can be shortened. The process for producing an N-vinylamide polymer by subjecting a monomer component comprising N-vinylamide to aqueous solution polymerization according to the present invention comprises the step of polymerizing the monomer component comprising N-vinylamide in the presence of an inorganic salt, which inorganic salt is present in an amount of not less than 7% by mass based on water in a uniform aqueous solution comprising the monomer component at a concentration not more than a saturated solution concentration thereof as measured at a polymerization initiation temperature.

5 Claims, No Drawings

US 8,445,586 B2

PROCESS FOR PRODUCING N-VINYLAMIDE POLYMER

This application is the U.S. national phase of International Application No. PCT/JP2009/002980 filed 29 Jun. 2009, which designated the U.S. and claims priority to JP Application No. 2008-222999 filed 1 Sep. 2008, the entire contents of each of which are hereby incorporated by reference.

TECHNICAL FIELD

The present invention relates to a process for producing a polymer comprising an N-vinylamide monomer unit, and more particularly, to a process for producing an N-vinylamide polymer which is a raw material of polyvinyl amine useful as a coagulant employed in water treatments, in particular, waste water treatments and as a paper-making reagent employed in paper industries, with a high quality in an industrial efficient manner.

BACKGROUND ART

The N-vinylamide polymers are useful as a raw material of polyvinyl amine which has been extensively used as a coagulant, a paper-making reagent, a fiber-treating agent, an additive for paints, etc., and it has been required that they are provided in the form of polymers having various extensive molecular weights including not only a high-molecular weight polymer having a molecular weight of not less than 4,000,000 but also a low-molecular weight polymer having a molecular weight of not more than 100,000 according to the applications thereof. The N-vinylamide polymers have been conventionally produced by various polymerization methods such as a reversed phase suspension polymerization method, an emulsion polymerization method, a belt photopolymerization method (photo-belt polymerization method), an aqueous solution standing adiabatic polymerization method and an aqueous solution dropping polymerization method. Among these polymerization methods, the belt photopolymerization and the aqueous solution standing adiabatic polymerization method are more simple and convenient and have such an advantage that polymers having various molecular weights are respectively produced by appropriately selecting the polymerization conditions.

As the polymerization method for producing the N-vinylamide polymers, there are conventionally known, for example, an aqueous solution polymerization method (Patent Document 1), an aqueous solution adiabatic polymerization method using combination of a redox initiator and an azo initiator (Patent Document 2), and the like. Also, it is known that the N-vinylamide polymers are produced by a belt photopolymerization method (Patent Document 3).

Further, there is also known a method for producing a dispersion of polymer particles by copolymerizing a monomer mixture comprising N-vinylamide and acrylonitrile in which an inorganic halide is added as a particle size modifier (Patent Document 4). However, this method is not an aqueous solution polymerization but relates to the technique for producing the dispersion of polymer particles, i.e., a method of controlling a particle diameter of the polymer particles precipitated by addition of the inorganic halide. Thus, the method described in Patent Document 4 does not relate to a method of improving a gel quality of the resulting polymers and controlling a polymerization reaction rate.

Patent Document 1: Japanese Patent Application Laid-Open (KOKAI) No. 61-118406
Patent Document 2: PCT Pamphlet WO 00/58378
Patent Document 3: Japanese Patent No. 3704660
Patent Document 4: Japanese Patent No. 3216070

DISCLOSURE OF THE INVENTION

Problems to be Solved by the Invention

As described above, since the N-vinylamide polymers are used in the form of a polymer having an extensive molecular weight including not only a high-molecular weight polymer having a molecular weight of not less than 4,000,000 but also a low-molecular weight polymer having a molecular weight of not more than 100,000 according to the applications thereof, it is required that the polymers are produced with a desired molecular weight. In particular, when the N-vinylamide polymers are in the form of a high-molecular weight polymer, there are present several technical problems to be solved. One of the problems is that an amount of a polymerization initiator used in the polymerization reaction must be reduced to as small a level as possible in order to obtain such a high-molecular weight polymer. However, the use of a reduced amount of the polymerization initiator necessarily leads to a low polymerization reaction rate which will result in a prolonged polymerization time. The other problem is that the polymer obtained after the polymerization is a considerably high-viscous gel-like material, and therefore tends to become soft and tends to be more difficult to handle as compared to other water-soluble polymers such as, for example, polyacrylamides.

Means for Solving Problems

As a result of the present inventors' earnest study, it has been found that when the N-vinylamide polymers are produced by an aqueous solution polymerization method in the presence of a predetermined amount of an inorganic salt, the polymerization time can be shortened, and the aimed polymer can be produced as a gel-like polymer having an excellent handling property. The present invention has been attained on the basis of the above finding.

That is, in an aspect of the present invention, there is provided a process for producing an N-vinylamide polymer by subjecting a monomer component comprising N-vinylamide to aqueous solution polymerization, said process comprising the step of polymerizing the monomer component comprising N-vinylamide in the presence of an inorganic salt, which inorganic salt is present in an amount of not less than 7% by mass based on water in a uniform aqueous solution comprising the monomer component at a concentration not more than a saturated solution concentration thereof as measured at a polymerization initiation temperature.

In the process for producing an N-vinylamide polymer according to preferred embodiments of the present invention, the inorganic salt is a metal halide, for example, the inorganic salt is a halide of an alkali metal or an alkali earth metal; the inorganic salt is selected from the group consisting of sodium chloride, potassium chloride and calcium chloride; the inorganic salt is present in an amount of not less than 10% by mass based on water in the monomer-containing aqueous solution at a concentration not more than a 80% concentration of a saturated solution concentration thereof as measured at a polymerization initiation temperature; and the aqueous solution polymerization is carried out by an aqueous solution standing adiabatic polymerization method or a belt photopolymerization method, and the resulting N-vinylamide polymer is taken out in the form of powdered particles obtained by finely dividing a aqueous gel of the N-vinylamide polymer.

Effect of the Invention

In accordance with the production process of the present invention, it is possible to produce the N-vinylamide polymer having not only a high molecular weight but also a low molecular weight in the form of an easily-handling polymer for a short polymerization time in an efficient manner without using any special apparatus. Therefore, the production process of the present invention is excellent from the industrial viewpoints. In addition, the N-vinylamide polymer produced by the process of the present invention which has an extensive molecular weight range is very useful as a raw material of polyvinyl amine used in various application fields such as a coagulant employed in water treatments, in particular, waste water treatments, a paper-making reagent employed in paper industries and an additive for paints, and can also be used in more extensive applications.

PREFERRED EMBODIMENTS FOR CARRYING OUT THE INVENTION

The present invention is described in more detail below.
[N-vinylamide(co)polymer]
The N-vinylamide used as a main monomer in the present invention is represented by the general formula: $CH_2=CH-NHCOR$ (wherein R is a hydrogen atom or an alkyl group having 1 to 6 carbon atoms).

Specific examples of the N-vinylamide include N-vinyl formamide (R=H) and N-vinyl acetamide (R=$CH_3$) as well as N-vinyl propionamide and N-vinyl butylamide. Among these N-vinylamides, N-vinyl formamide is preferred in view of easiness in derivation to the polyvinyl amine.

The N-vinylamide can be copolymerized with an optional monomer having an ethylenically unsaturated bond, if required. Specific examples of the monomer copolymerizable with the N-vinylamide include (meth)acrylic acid and salts thereof, (meth)acrylic acid esters, (meth)acrylonitrile, (meth)acrylamide, N-alkyl(meth)acrylamides, N,N-dialkyl (meth)acrylamides, dialkylaminoethyl(meth)acrylamides and salts or quaternarized products thereof, dialkylaminopropyl (meth)acrylamides and salts or quaternarized products thereof, diacetone acrylamide, N-vinyl pyrrolidone, N-vinyl caprolactam and vinyl acetate.

The content of the N-vinylamide in the monomer component comprising the N-vinylamide as used in the present invention may vary depending upon the (co)polymer as aimed, and is usually not less than 50 mol %, preferably not less than 70 mol % and more preferably 90 to 100 mol %.

In the production process of the present invention, a uniform aqueous solution of the monomer component comprising the N-vinylamide is subjected to aqueous solution polymerization. In this case, it is essentially required that the aqueous solution polymerization is carried out in the presence of an inorganic salt which is present in a predetermined amount, i.e., in an amount of not less than 7% by mass based on water in the aqueous solution at a concentration not more than a saturated solution concentration thereof as measured at a polymerization initiation temperature. In the present invention, when a predetermined amount of the inorganic salt is allowed to be present in an aqueous system of the aqueous solution polymerization, the proportion of a solid content in an aqueous gel of the resulting N-vinylamide polymer can be increased to thereby form a hard aqueous gel having an improved handling property, and further the polymerization reaction rate can be considerably enhanced.

The inorganic salt used in the present invention is not particularly limited as long as the inorganic salt is water-soluble. However, in view of good handling property and low price, a metal halide is preferably used. As the metal halide, there may be used halides of an alkali metal and an alkali earth metal. Specific examples of the metal halide include sodium chloride, potassium chloride, calcium chloride, potassium bromide and sodium bromide. Among these metal halides, preferred are metal chlorides. More specifically, sodium chloride, potassium chloride and calcium chloride are preferably used in view of inexpensiveness. Among them, especially preferred is sodium chloride.

The lower limit of the amount of the inorganic salt being present in the aqueous system of the aqueous solution polymerization is 7% by mass and preferably 10% by mass based on water in the monomer-containing aqueous solution. When the content of the inorganic salt is less than 7% by mass, the polymerization time tends to be hardly shortened, and the desired effects on properties of the aqueous gel tends to be hardly obtained. The upper limit of the amount of the inorganic salt is a saturated solution concentration thereof and preferably a concentration corresponding to a 80% concentration of the saturated solution concentration. Although the use of a larger amount of the inorganic salt has a larger effect, such a larger amount, i.e., a more than necessary amount of the inorganic salt tends to cause precipitation of the inorganic salt in the aqueous system and therefore tends to become uneconomical.

[Aqueous Solution Polymerization]
The aqueous solution polymerization used in the process of the present invention is carried out in a homogeneous system of the aqueous solution comprising the monomer component. The homogeneous system may be a system in which the aqueous solution comprising the monomer component is maintained in a uniform state, and may also include such a system in which a part of the inorganic salt is precipitated on a bottom surface of a polymerization reaction container. The aqueous solution polymerization may also be conducted in the form of standing polymerization in an adiabatic system or belt photopolymerization in which the polymerization of the aqueous solution is carried out using a photoinitiator by irradiating a thin film layer of the monomer-containing aqueous solution with light.

The pH of the monomer-containing aqueous solution used in the aqueous solution polymerization of the present invention is usually 5 to 9. When the pH of the monomer-containing aqueous solution is out of the above-specified range, the loss of the N-vinylamide tends to be increased owing to hydrolysis upon the polymerization, or the thus produced hydrolyzed product tends to cause undesirable gelling of the water-insoluble material upon modifying the resulting polymer into polyvinyl amine.

The monomer-containing aqueous solution is controlled to a polymerization initiation temperature prior to the polymerization. The polymerization initiation temperature is usually −10 to 30° C. and preferably −5 to 20° C.

The type of the aqueous solution polymerization used in the present invention is not particularly limited, and is preferably carried out by either aqueous solution standing adiabatic polymerization or belt photopolymerization.

When the polymerization reaction is carried out by aqueous solution standing adiabatic polymerization, the monomer-containing aqueous solution is filled in an adiabatic reaction vessel equipped with a thermometer and a nitrogen inlet tube, and then exposed to nitrogen. Next, a radical polymerization initiator is added to and mixed with the aqueous solution to initiate the polymerization reaction thereof. At this time, the monomer-containing aqueous solution is previously prepared by adding the monomer component (including the N-vinylamide, etc.) together with the inorganic salt to deionized water to dissolve the monomers therein, and then after the pH of the obtained aqueous solution is suitably adjusted, the aqueous solution is controlled to the polymerization initiation temperature.

In addition, the concentration of the monomer component including the N-vinylamide in the monomer-containing aqueous solution is usually adjusted to 20 to 40% by mass and preferably 25 to 35% by mass. When the monomer concentration in the aqueous solution is excessively low out of the above-specified range, the productivity of the aimed polymer tends to be deteriorated, and the resulting aqueous gel tends to be undesirably softened so that there tend to arise the problems such as adverse influence on drying of the aqueous gel owing to occurrence of fusion of the gel particles having a reduced particle size as well as deterioration in handling properties thereof such as transportability and moveability. On the contrary, when the monomer concentration in the aqueous solution is excessively high out of the above-specified range, the amount of heat generated from the reaction tends to be large, so that undesirable boiling polymerization tends to be caused.

As the polymerization initiator used in the aqueous solution standing adiabatic polymerization, there may be used ordinary polymerization initiators such as a redox initiator, an azo initiator, a peroxide and combination of these initiators. These polymerization initiators may be either water-soluble or oil-soluble. However, it is required that the oil-soluble initiator is added in the form of a solution prepared by dissolving the oil-soluble initiator in a water-miscible solvent. Examples of the water-soluble azo initiator include 2,2'-azobis(amidinopropane)dihydrochloride, 2,2'-azobis[2-(5-methyl-2-imidazolin-2-yl)propane]dihydrochloride and 4,4'-azobis(4-cyano-valeric acid). Examples of the oil-soluble azo initiator include 2,2'-azobis-isobutyronitrile, 1,1'-azobis(cyclohexanecarbonitrile), 2,2'-azobis(2-methyl butyronitrile), 2,2'-azobis(2-methyl propionate) and 2,2'-azobis(4-methoxy-2,4-dimethyl)valeronitrile.

Examples of the redox initiator include combination of ammonium peroxodisulfate with sodium sulfite, sodium hydrogen sulfite, trimethylamine, tetramethyl ethylenediamine, etc., and combination of t-butyl hydroperoxide with sodium sulfite, sodium hydrogen sulfite, etc. Examples of the peroxide include ammonium or potassium peroxodisulfate, hydrogen peroxide, benzoyl peroxide, lauryl peroxide, octanoyl peroxide, succinic peroxide and t-butyl peroxy-2-ethyl hexanoate. Among these redox initiators, most preferred is combination of the redox initiator with the water-soluble azo initiator in which combination of t-butyl hydroperoxide with sodium sulfite or sodium hydrogen sulfite is preferably used as the redox initiator, and 2,2'-azobis(2-amidinopropane)dihydrochloride is preferably used as the water-soluble azo initiator.

The amount of the polymerization initiator used may be appropriately determined such that the azo initiator is used in an amount of usually 100 to 10000 ppm and preferably 500 to 5000 ppm based on the monomer component, and the redox initiator is used in an amount of usually 10 to 300 ppm and preferably 30 to 100 ppm based on the monomer component. When the amount of the polymerization initiator used is too small, it may be difficult to attain a sufficient polymerization reaction rate. When the amount of the polymerization initiator used is too large, the resulting polymer tends to have an undesirably low molecular weight although the polymerization reaction rate is increased.

The polymerization initiation temperature may vary depending upon concentration and amount of the monomer component, and amount of the initiator, etc., and is usually −10 to 30° C. and preferably −5 to 20° C. so as to prevent boiling of the reaction system.

In the polymerization reaction, as described above, water, the inorganic salt, the monomer component, etc., are previously mixed with each other, and the obtained uniform monomer-containing aqueous solution is controlled to the polymerization initiation temperature and then added to an adiabatic reaction vessel where the monomer-containing aqueous solution is exposed to nitrogen to remove dissolved oxygen therefrom, followed by adding the initiator thereto to initiate the polymerization reaction. After completion of mixing the polymerization initiator in the monomer-containing aqueous solution, the exposure to nitrogen is stopped, and the resulting reaction solution is allowed to stand in order to confirm the time at which the temperature within the reaction vessel reaches the highest value owing to the polymerization reaction, followed by further subjecting the reaction solution to aging for about 30 to about 120 min. After completion of the aging, the polymer obtained after the aging is taken out of the reaction vessel to obtain a massive aqueous gel of the N-vinylamide polymer.

In the case where the polymerization reaction is performed by photopolymerization, for example, by belt photopolymerization, in which the monomer-containing aqueous solution spread into a thin film layer is irradiated with light, there is generally used a continuous belt method using a movable support member. In this method, the monomer-containing aqueous solution comprising the N-vinylamide as a main component is spread over a belt, and one and/or both surfaces of the resulting thin film layer of the aqueous solution are irradiated with light while removing heat from an upper surface of the thin film layer or a lower surface of the belt, so that the polymer is obtained in the form of a hard aqueous gel having a good handling property. At this time, the monomer-containing aqueous solution to be spread into a thin film layer may be previously prepared by dissolving the monomer component, a predetermined amount of the inorganic salt, the photoinitiator, etc., in water; after suitably adjusting the pH of the obtained solution if required, subjecting the solution to exposure to nitrogen; and then controlling the solution the polymerization initiation temperature.

The concentration of the monomer component in the monomer-containing aqueous solution is usually 20 to 80% by mass and preferably 30 to 70% by mass. The reason therefor is as follows. That is, when the monomer concentration is too low, there tend to arise not only the problem concerning a poor productivity but also such a problem that the resulting gel becomes too soft and has a reduced particle size so that the gel particles are fused together, which may result in adverse influence on drying of the aqueous gel and deterioration in handling properties thereof such as transportability and moveability. On the other hand, when the monomer concentration is too high, the heat generated from the reaction tends to become large which may result in need of a large-scale cooling facility or suppression of the polymerization reaction in the midway.

In addition, the thickness of the thin film layer of the monomer-containing aqueous solution upon the polymerization reaction is usually 1 to 50 mm, preferably 2 to 30 mm and more preferably 5 to 20 mm. The reason therefor is as follows. That is, when the thickness of the thin film layer is too small, it may be difficult to efficiently produce the aimed polymer. When the thickness of the thin film layer is too large, it may be difficult to remove heat generated upon the polymerization reaction to a sufficient extent.

In the process of the present invention, the radical photoinitiator used in the belt photopolymerization method may be coexist in the monomer composition solution upon the polymerization. As the photoinitiator, there may be appropriately selected and used a mixture comprising one or more kinds of conventionally known compounds. More concretely, as the photoinitiator, there may be used benzophenone initiators, benzoin initiators, benzoin alkyl ether initiators, benzyl dimethyl ketal initiators, α-hydroxyketone initiators, bisacylphosphine oxide initiator, etc. Specific examples of the photoinitiator include benzophenone, benzoin, benzoin ethyl ether, 2,2-dimethoxy-1,2-diphenylethan-1-one, 1-hydroxycyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, 2-methyl-1-[4-(methylthio) phenyl]-2-morpholino-propan-1-one, 2-benzyl-2-dimethylamino-1-(4-morpholinophenyl)-1-butan-1-one, bis(2,6-dimethoxybenzoyl)-2,4,4-trimethyl-1-pentyl phosphine oxide, bis(2,4,6-trimethylbenzoyl)-phenyl phosphine oxide and (2,4,6-trimethylbenzoyl)-diphenyl phosphine oxide. The photoinitiator may be added in an amount of usually 10 to 10,000 ppm, preferably 20 to 5,000 ppm and more preferably 50 to 2,000 ppm based on the monomer component.

In addition, the photoinitiator may be used in combination with an adequate sensitizer. Examples of the sensitizer include amines, halides, iodonium salts and thioxantones. Specific examples of the sensitizer include methyldiethanol amine, bisdiethylaminobenzophenone, diethyl thioxanthone and isopropyl thioxanthone.

Further, in some cases, the above photoinitiator may be used in combination with the azo initiator. Specific examples of the azo initiator include 2,2'-azobis(4-methoxy-2,4-dimethylvaleronitrile), 2,2'-azobis(2,4-dimethylvaleronitrile), 2,2'-azobis-isobutyronitrile), 2,2'-azobis(2-amidinopropane) dihydrochloride, 2,2'-azobis[2-(2-imidazolin-2-yl)propane] and a dihydrochloride or a diacetate thereof, 2,2'-azobis[2-methyl-N-(2-hydroxyethyl)propionamide], dimethyl 2,2'-azobis-isobutyrate, and 4,4'-azobis(4-cyanovaleric acid) and a disodium salt or a dipotassium salt thereof. These azo compounds may be used alone or in the form of a mixture of any two or more thereof. The amount of the azo compound added is usually not more than 10,000 ppm, preferably not more than 5,000 ppm and more preferably not more than 2,000 ppm.

In the present invention, when the polymerization reaction is performed by the belt photopolymerization method, the gel temperature is raised owing to heat of polymerization at a later stage of the polymerization reaction. Therefore, by using the azo initiator having a suitable thermal decomposition temperature, it is possible to promote the polymerization reaction. Further, the polymerization time can be shortened, resulting in high productivity. In addition, since the residual amount of the monomer component can be reduced, occurrence of gelation of the resulting product can be avoided during the step of modifying it into polyvinyl amine. Furthermore, since the amount of the photoinitiator used is small, the obtained product can be prevented from suffering from the problems such as yellow discoloration.

As the light irradiated upon the polymerization, a light source having a main wavelength range of 250 to 500 nm is preferably used. Specific examples of the light source include a high-pressure mercury lamp, a metal halide lamp, a fluorescent chemical lamp, and a blue fluorescent lamp. The intensity of light irradiated may be optionally controlled by varying an amount of the photoinitiator, the polymerization temperature, etc. The irradiation with light is preferably carried out such that the light intensity on a plane to be irradiated is in the range of 0.1 to 100 W/m$^2$. When the intensity of light irradiated is too weak, the polymerization time tends to be prolonged. On the other hand, when the intensity of light irradiated is too strong, undesirable side reactions such as insolubilization of the resulting polymer tend to be caused, and further the polymerization tends to proceed too rapidly so that the use of a large-scale cooling facility tends to be required in order to sufficiently remove heat generated thereupon.

The polymerization initiation temperature used in the belt photopolymerization may vary depending upon a concentration and an amount of the monomer component, an amount of the initiator, etc., and is usually −10 to 30° C. and preferably −5 to 20° C.

Also, in the belt photopolymerization used in the present invention, as the polymerization reaction proceeds, the viscosity of the reaction system tends to be increased, so that the efficiency of removal of heat tends to be lowered and the reaction temperature tends to be raised. If the temperature of the reaction system is excessively raised, there tends to arise such a problem that undesirable side reactions such as hydrolysis are caused during the polymerization step. Therefore, the temperature of the reaction system is suitably controlled to usually not higher than 100° C., preferably not higher than 95° C. and more preferably not higher than 90° C. to prevent boiling of the reaction system.

As the method of removing heat of polymerization, there may be used various known methods. Among these methods, a water cooling method in which water is sprayed over the surface to be cooled, or an air cooling method in which the surface to be cooled is brought into contact with an air flow, are preferably used because of its simplicity.

In the process of the present invention, when the polymerization is performed by the aqueous solution standing adiabatic polymerization method or belt photopolymerization method, the inorganic salt is allowed to be present in a predetermined amount, i.e., in an amount of not less than 7% by mass based on water in the aqueous solution comprising the monomer component and at a concentration not less than a saturated solution concentration thereof as measured at the polymerization initiation temperature so that the polymerization reaction rate can be increased. In particular, even when the polymerization is conducted in the presence of the predetermined amount of the inorganic salt, no undesirable side effects such as reduction in molecular weight of the polymer produced and increase in residual amount of the monomer component are observed. In the conventional industrial production methods, the amount of the initiator used must be increased in order to attain a sufficient polymerization reaction rate. However, if the amount of the initiator used is increased, the molecular weight of the resulting polymer tends to be decreased on the other side. Thus, the process of the present invention is industrially advantageous because the aimed polymer having a desired molecular weight can be produced at a sufficient polymerization reaction rate without using a large amount of the initiator.

[Reduction of Particle Size of Polymer Produced]

In the process of the present invention, even when the polymerization is performed by any of the aqueous solution standing adiabatic polymerization method and belt photopolymerization method, after completion of the polymerization, it is possible to obtain the N-vinylamide polymer in the form of a massive aqueous gel. The thus obtained massive aqueous gel may be usually cut and then pulverized into particles. The particle size upon the pulverization is controlled such that an average particle size of the obtained particles is usually not more than 5 cm, preferably not more than 2 cm and more preferably not more than 1 cm. As the pulverization method, there may be used various conventionally known methods. Examples of the pulverization method include a method of cutting the gel using a cutter, etc., a method of cutting the gel by extruding the gel through a meat chopper, etc., and the like. When using the meat chopper, a pore size of a die of the meat chopper is usually not more than 5 cm, preferably not more than 2 cm and more preferably not more than 1 cm.

The particles thus pulverized are further finely divided, if required, in order to efficiently convert the resulting polymer into polyvinyl amine, etc., by hydrolysis modification thereof. The thus obtained finely divided particles may be dried and further powdered.

As the method of finely dividing the particles, there may be used the method in which the particles are finely divided into a desired particle size using a meat chopper, etc., by suitably adjusting a die pore size thereof. The particle size of the resulting finely divided particles is usually about 1 to about 7 mm.

The thus obtained particles may be dried at a temperature of usually 50 to 140° C., preferably 60 to 130° C. and more preferably 70 to 120° C. when the drying temperature is too low, the drying efficiency of the particles tends to be deteriorated. When the drying temperature is too high, the resulting polymer tends to be deteriorated in quality.

In the case where the particles thus dried are powdered again, the particle size of the powdered particles may be optionally determined. However, when the particle size is too large, a prolonged time tends to be required to dissolve the powdered particles. When the particle size is too small, undissolved lumps of the powdered particles tend to be formed upon dissolving the powdered particles, or working environmental conditions tend to be deteriorated owing to generation of powdery dust. Therefore, the particle size of the particles obtained after being dried is usually controlled to the range of from 4 mesh-pass to 500 mesh-on. In addition, the particles falling within the range of from 10 mesh-pass to 100 mesh-on are preferably present in an amount of not less than 80% and more preferably not less than 90%.

When the particles are pulverized or finely divided, an auxiliary agent may be added to suppress occurrence of sticking between the particles. As the auxiliary agent, there may be usually used various oils such as polyalkylene glycols and silicone oils, surfactants or the like. The auxiliary agent may be applied on a surface of the massive aqueous gel before pulverized, or may be added together with the aqueous gel into a pulverizer, or may be mixed with the particulate gel obtained after the pulverization. In some cases, the auxiliary agent may be previously present in an aqueous system of the polymerization reaction.

If the aqueous gel is too soft or too sticky when pulverized or finely divided, it may be difficult to cut the aqueous gel using a cutter, so that the aqueous gel tends to be adhered to the cutter. Also, even if such a soft or sticky gel is cuttable, the cutting speed tends to be lowered. On the other hand, in the process of the present invention, the aqueous gel of the resulting polymer can exhibit a suitable hardness by allowing the inorganic salt to be present in the polymerization reaction system. As a result, it is possible to easily cut and finely divide the aqueous gel.

In addition, when it is intended to produce the polymer having a relatively low molecular weight by the aqueous solution polymerization method, there tends to be sometimes caused such a problem that the aqueous gel of the obtained polymer becomes too soft so that the particle size reduction treatment of the aqueous gel such as disaggregation may be disabled. However, according to the process of the present invention, even when the polymer having a molecular weight lower than an ordinary molecular weight is produced in the system in which the inorganic salt is allowed to be present, the aqueous gel of the resulting polymer can exhibit a hardness which is suitable for imparting a good handling property thereto, so that the finely dividing treatment can be carried out using an ordinary apparatus.

The N-vinylamide polymer is modified by hydrolysis to produce polyvinyl amine. In this case, the above gel having a reduced particle size may be directly immersed while maintaining its gelled shape in a modifying agent such as, for example, an alkali solution to subject the gel to hydrolysis, thereby converting the gel into the polyvinyl amine. Alternatively, the gel particles may be dried and pulverized to once form powdered particles having a reduced particle size, and the resulting powdered particles may be dissolved in water to prepare an aqueous solution thereof again, and then the obtained aqueous solution may be subjected to hydrolysis with an alkali, etc., to produce the polyvinyl amine.

In any of the above methods in which the polyvinyl amine is produced by hydrolysis, when the particle size of the gel of the N-vinylamide polymer as a raw material of the polyvinyl amine is increased owing to fusion therebetween, there tends to arise such a problem that when directly modifying the gel, a modifying agent (hydrolyzing agent) fails to be impregnated into the gel so that the reaction hardly proceeds uniformly, or such a problem that when using the drying method in which the gel-like particles are dried and then pulverized, the particles are fused together so that a drying efficiency thereof is considerably lowered. For this reason, the hardness of the aqueous gel of the resulting polymer becomes more important upon production of the N-vinylamide polymer. In particular, the hardness of the aqueous gel of the resulting polymer becomes most important when the polymer having a lower molecular weight is produced using the aqueous solution having a low monomer concentration by the aqueous solution adiabatic polymerization method. In the process of the present invention, since the inorganic salt is allowed to be present in the polymerization reaction system, it is possible to produce even the polymer having a low molecular weight in the form of an aqueous gel having a pulverizable hardness by increasing a solid content in the gel, and further the polymerization time can be shortened. Thus, the present invention has excellent effects.

EXAMPLES

Next, the present invention is described in still more detail by Examples. However, the preset invention is not particularly limited to the following Examples, and various modifications and changes are possible unless departing from a subject matter of the present invention.

Meanwhile, the properties of the polymers produced in the following Examples and Comparative Examples were measured by the following methods.

(Evaluation of Handling Property of Gel)

The massive gel piece obtained by aqueous solution polymerization was cut into 3 cm square or less, and then the cut gel piece was treated using a meat chopper having a die pore size of 4.8 mm. The handling property of the gel was evaluated from the shape of the gel obtained by passing through the die, according to the following three ratings.

A: The shape of finely divided gel particles was maintained as such, and the gel was therefore excellent in handling property.

B: Some plural gel particles obtained after being finely divided were fused together, and the gel was slightly deteriorated in handling property owing to increase in particle size thereof.

C: All of the gel particles obtained after being finely divided were fused together into a strand shape, and the gel was difficult to handle.

(Measurement of Reduced Viscosity)

The sample polymer was dissolved in 1N NaCl aqueous solution to prepare a solution having a concentration (pure content) of 0.1 g/dL, and the flow-down time of the solution was measured using an Ostwald viscometer at 25° C. The flow-down time of the 1N brine was measured in the same manner. The reduced viscosity of the polymer was calculated from the following formula.

Reduced Viscosity $(\eta_{sp}/C)=(t-t_0)/t_0/0.1$ [dL/g]

wherein t: a flow-down time (sec) of the sample solution; and $t_0$: a flow-down time (sec) of 1N brine.

(Measurement of Polymerization Conversion Rate)

A polymer powder was extracted with a mixed solvent of methanol and water (ratio of water:methanol=2:8), and the resulting extract solution was analyzed by liquid chromatography. As main impurities, N-vinylamide and a water adduct of the N-vinylamide were detected. The total amount of the N-vinylamide and the water adduct thereof was calculated in terms of N-vinylamide as a residual amount of the monomer component, and further was corrected with an amount of volatile components as measured separately to calculate a conversion rate of the monomer component.

Example 1

Polyethylene glycol in an amount of 0.3 part by mass (average molecular weight: 20000) was dissolved in 70 parts by mass of deionized water, and then mixed with 30 parts by mass of N-vinyl formamide (purity: 99% by mass). Then, industrial sodium chloride (34.2% by mass based on a saturated solution concentration at 0° C.) was dissolved in the resulting monomer aqueous solution in such an amount that a concentration of the sodium chloride was 9% by mass based on water in the aqueous solution. Thereafter, the pH of the monomer aqueous solution was adjusted to 6.3 with phosphoric acid to prepare a monomer preparation solution.

The resulting monomer preparation solution was cooled to 0° C. and then transferred into an adiabatic reaction vessel equipped with a thermometer where the solution was exposed to nitrogen for 15 min. Thereafter, 75 ppm (based on a whole aqueous solution) of 2,2'-azobis(2-amidinopropane)dihydrochloride (tradename "V-50" produced by Wako Junyaku Co., Ltd.) and 60 ppm (based on a whole aqueous solution) of t-butyl hydroperoxide (tradename "Perbutyl H-69" produced by Nippon Oils & Fats Co., Ltd.) were added in the form of a 10% aqueous solution thereof to the monomer preparation solution, and then 60 ppm (based on a whole aqueous solution) of sodium hydrogen sulfite (MBS) was added in the form of a 10% aqueous solution thereof to the monomer preparation solution to initiate the polymerization reaction.

After the elapse of 130 min from initiation of the polymerization reaction, it was confirmed that the temperature in the system reached a maximum point. Thereafter, the reaction mixture was further held in the reaction vessel for 30 min (total polymerization time: 160 min). Then, the thus produced polymer was withdrawn from the reaction vessel, thereby obtaining a poly(N-vinyl formamide) gel-1 having an excellent handling property.

The thus obtained poly(N-vinyl formamide) gel-1 was cut into 3 cm square, and the cut gel piece was treated by a meat chopper having a die pore size of 4.8 mm to finely divide the gel piece into particles having a particle size of 5 mm square or less. The resulting gel particles maintained their fine particle shape and had a good handling property. Next, the thus obtained particles were dried at 80° C. for 2 hr, and the dried particles were crushed by a Wiley mill to obtain powdered particles (content of particles having a particle size of from 10 mesh-pass to 100 mesh-on: not less than 95%). As a result of measuring properties of the thus obtained poly(N-vinyl formamide) gel-1 powdered particles, it was confirmed that the gel powdered particles had a reduced viscosity of 8.3 [dL/g], and the polymerization conversion rate was 97.8% by mass.

Examples 2 to 8

The same procedure as defined in Example 1 was conducted except that the amounts of the initiator and the inorganic salt added were changed as shown in Table 1, thereby obtaining respective poly(N-vinyl formamide) gels-2 to –8 as well as powdered products thereof. The properties of the thus obtained powdered products were measured. The results are shown in Table 2.

Example 9

Fifty parts by mass of N-vinyl formamide (purity: 99% by mass) were mixed in 50 parts by mass of deionized water. Then, industrial sodium chloride (34.2% by mass based on a saturated solution concentration at 10° C.) was dissolved in the resulting monomer aqueous solution in such an amount that a concentration of the sodium chloride was 9% by mass based on water in the aqueous solution. Thereafter, the pH of the monomer aqueous solution was adjusted to 6.3 with phosphoric acid to prepare a monomer preparation solution.

Then, 1600 ppm (based on a whole aqueous solution) of sodium phosphinate in the form of a 10% aqueous solution thereof as a chain transfer agent and 2000 ppm (based on a whole aqueous solution) of a photopolymerization initiator "D4265" (produced by Ciba Specialty Chemicals Corp.) were added to the above prepared monomer preparation solution, and the resulting solution was exposed to nitrogen for 20 min while being cooled to 10° C. to remove residual oxygen therefrom.

A polyethylene terephthalate film [base film thickness: 12 μm; PVDC (polyvinylidene chloride) coat thickness: 4 μm] was placed on a stainless steel bottom portion (bottom surface area: 200 mm×200 mm) of a tray-shaped container, and then the above monomer preparation solution was filled in the container in such an amount that a thickness of the solution filled was 10 mm, followed by covering an upper surface of the container with a polyethylene terephthalate film. The container was irradiated with light from above using a fluorescent chemical lamp such that an irradiation intensity as measured on the surface to be irradiated was 10 W/m². During the irradiating period, the stainless steel bottom of the container was sprayed with cold water at 10° C. to remove a heat of polymerization therefrom. After the elapse of 60 mm from initiation of the reaction, the spraying of cold water was stopped, and then the irradiation intensity was increased to 20 W/m² at which the polymerization was further continued for 90 min. It was confirmed that the polymerization temperature reached its maximum point after the elapse of 85 min from initiation of the irradiation with light.

After completion of conducting the belt photopolymerization for 150 min in total, the resulting polymer was withdrawn from the reaction vessel, thereby obtaining a poly(N-vinyl formamide) gel-9 having an excellent handling property.

The thus obtained poly(N-vinyl formamide) gel-9 was cut into 2 cm square, and the cut gel piece was treated by a meat chopper having a die pore size of 4.8 mm to finely divide the gel piece into particles having a particle size of 5 mm square or less. The resulting gel particles maintained their fine particle shape and had a good handling property. Next, the thus obtained particles were dried at 80° C. for 2 hr, and the dried particles were crushed by a Wiley mill to obtain powdered particles. As a result of measuring properties of the thus obtained poly(N-vinyl formamide) gel-9 powdered particles, it was confirmed that the gel powdered particles had a reduced viscosity of 2.5 [dL/g], and the polymerization conversion rate was 99.9% by mass.

Comparative Examples 1 to 4

The same procedure as defined in Example 1 was conducted except that the amounts of the initiator and the inorganic salt added were changed as shown in Table 1, thereby obtaining respective poly(N-vinyl formamide) gels-10 to -13 as well as powdered products thereof. The properties of the thus obtained powdered products were measured. The results are shown in Table 2.

Comparative Example 5

The same procedure as defined in Example 9 was conducted except that the amounts of the initiator and the inorganic salt added were changed as shown in Table 1, thereby obtaining a poly(N-vinyl formamide) gel-14 and a powdered product thereof. The properties of the thus obtained powdered product were measured. The results are shown in Table 2.

TABLE 1

| Polymerization formulations | Polymerization methods | Monomer aqueous solution (part by mass) | |
|---|---|---|---|
| | | Deionized water | NVF |
| Example 1 | Adiabatic standing | 70 | 30 |
| Example 2 | Adiabatic standing | 70 | 30 |
| Example 3 | Adiabatic standing | 70 | 30 |
| Example 4 | Adiabatic standing | 70 | 30 |
| Example 5 | Adiabatic standing | 70 | 30 |
| Example 6 | Adiabatic standing | 70 | 30 |
| Example 7 | Adiabatic standing | 70 | 30 |
| Example 8 | Adiabatic standing | 70 | 30 |
| Example 9 | Photo-belt | 50 | 50 |
| Comparative Example 1 | Adiabatic standing | 70 | 30 |
| Comparative Example 2 | Adiabatic standing | 70 | 30 |
| Comparative Example 3 | Adiabatic standing | 70 | 30 |
| Comparative Example 4 | Adiabatic standing | 70 | 30 |
| Comparative Example 5 | Photo-belt | 50 | 50 |

TABLE 1-continued

| Polymerization formulations | Initiator (ppm) | Inorganic salt (part by mass) | |
|---|---|---|---|
| | | NaCl | Others |
| Example 1 | BHP/MBS/V-50 = 60/60/75 | 9 | 0 |
| Example 2 | BHP/MBS/V-50 = 50/50/75 | 15 | 0 |
| Example 3 | BHP/MBS/V-50 = 40/40/75 | 20 | 0 |
| Example 4 | BHP/MBS/V-50 = 50/50/75 | 20 | 0 |
| Example 5 | BHP/MBS/V-50 = 60/60/75 | 20 | 0 |
| Example 6 | BHP/MBS/V-50 = 60/60/75 | 0 | KCL = 6 |
| Example 7 | BHP/MBS/V-50 = 60/60/75 | 5 | 0 |
| Example 8 | BHP/MBS/V-50 = 60/60/75 | 0 | $CaCl_2$ = 17 |
| Example 9 | D4265 = 2000 | 9 | 0 |
| Comparative Example 1 | BHP/MBS/V-50 = 50/50/75 | 0 | 0 |
| Comparative Example 2 | BHP/MBS/V-50 = 60/60/75 | 0 | 0 |
| Comparative Example 3 | BHP/MBS/V-50 = 75/75/75 | 0 | 0 |
| Comparative Example 4 | BHP/MBS/V-50 = 60/60/75 | 3 | 0 |
| Comparative Example 5 | D4265 = 2000 | 0 | 0 |

| Polymerization formulations | Amount of inorganic salt based on water (% by mass) | Liquid temperature (° C.) | Concentration based on saturated solution concentration (% by mass) |
|---|---|---|---|
| Example 1 | 12.6 | 0 | 34.2 |
| Example 2 | 21.4 | 0 | 57.0 |
| Example 3 | 28.6 | 0 | 76.0 |
| Example 4 | 28.6 | 0 | 76.0 |
| Example 5 | 28.6 | 0 | 76.0 |
| Example 6 | 8.6 | 0 | 30.5 |
| Example 7 | 7.1 | 0 | 19.0 |
| Example 8 | 24.3 | 0 | 76.0 |
| Example 9 | 18.0 | 10 | 34.2 |
| Comparative Example 1 | 0 | 0 | 0.0 |
| Comparative Example 2 | 0 | 0 | 0.0 |
| Comparative Example 3 | 0 | 0 | 0.0 |
| Comparative Example 4 | 4.3 | 0 | 11.4 |
| Comparative Example 5 | 0 | 10 | 4.0 |

Note
NVF: N-vinyl formamide
BHP: Perbutyl H-69
MBS: Sodium hydrogen sulfite

TABLE 2

| Polymerization results | Polymerization time (min) | Gel No. | Reduced viscosity [dL/g] |
|---|---|---|---|
| Example 1 | 160 | 1 | 8.3 |
| Example 2 | 150 | 2 | 7.9 |
| Example 3 | 150 | 3 | 9.4 |
| Example 4 | 125 | 4 | 7.4 |
| Example 5 | 115 | 5 | 6.8 |
| Example 6 | 175 | 6 | 8.4 |
| Example 7 | 225 | 7 | 7.7 |

TABLE 2-continued

| Polymerization results | Conversion rate (%) | Gel handling property | Polymerization time |
|---|---|---|---|
| Example 8 | 165 | 8 | 9.3 |
| Example 9 | 150 | 9 | 2.5 |
| Comparative Example 1 | 285 | 10 | 10.3 |
| Comparative Example 2 | 240 | 11 | 8.5 |
| Comparative Example 3 | 175 | 12 | 6.7 |
| Comparative Example 4 | 240 | 13 | 6.7 |
| Comparative Example 5 | 150 | 14 | 2.1 |
| Example 1 | 97.8 | A | A |
| Example 2 | 97.5 | A | A |
| Example 3 | 97.2 | A | A |
| Example 4 | 97.4 | A | A |
| Example 5 | 97.3 | A | A |
| Example 6 | 97.0 | A | A |
| Example 7 | 97.2 | A | B |
| Example 8 | 97.1 | A | A |
| Example 9 | 99.9 | A | A |
| Comparative Example 1 | 97.4 | A | C |
| Comparative Example 2 | 97.6 | B | C |
| Comparative Example 3 | 97.2 | C | A |
| Comparative Example 4 | 97.5 | C | C |
| Comparative Example 5 | 99.9 | C | A |

| Handling property of gel after treated by meat chopper | A | Shape of fine gel particles was maintained, and gel was easy to handle |
| | B | Some plural gel particles after finely divided were fused together, and gel was slightly deteriorated in handling property owing to increase in particle size |
| | C | All of gel particles after finely divided were fused into strands, and gel was difficult to handle |
| Polymerization time | A | Polymerization time including aging time was less than 180 min |
| | B | Polymerization time including aging time was less than 240 min |
| | C | Polymerization time including aging time was less than 240 min |

The invention claimed is:

1. A process for producing an N-vinylamide polymer by subjecting a monomer component comprising N-vinylamide to aqueous solution polymerization, said process comprising the step of polymerizing the monomer component comprising N-vinylamide in the presence of an inorganic salt, which inorganic salt is present in an amount of not less than 7% by mass based on water in a uniform aqueous solution comprising the monomer component at a concentration not more than a saturated solution concentration thereof as measured at a polymerization initiation temperature wherein the aqueous solution polymerization is carried out by an aqueous solution standing adiabatic polymerization method or a belt photopolymerization method, and the resulting N-vinylamide polymer is taken out in the form of powdered particles obtained by finely dividing an aqueous gel of the N-vinylamide polymer.

2. A process for producing an N-vinylamide polymer according to claim 1, wherein the inorganic salt is a metal halide.

3. A process for producing an N-vinylamide polymer according to claim 1, wherein the inorganic salt is a halide of an alkali metal or an alkali earth metal.

4. A process for producing an N-vinylamide polymer according to claim 2, wherein the metal halide is selected from the group consisting of sodium chloride, potassium chloride and calcium chloride.

5. A process for producing an N-vinylamide polymer according to claim 1, wherein the inorganic salt is present in an amount of not less than 10% by mass based on water in the aqueous solution comprising the monomer component at a concentration not more than 80% by mass concentration of a saturated solution concentration thereof as measured at a polymerization initiation temperature.

* * * * *